March 28, 1950 — L. YOUNG — 2,502,300
QUARTERTONE SLIDE RULE FOR MUSICIANS
Filed Sept. 5, 1945
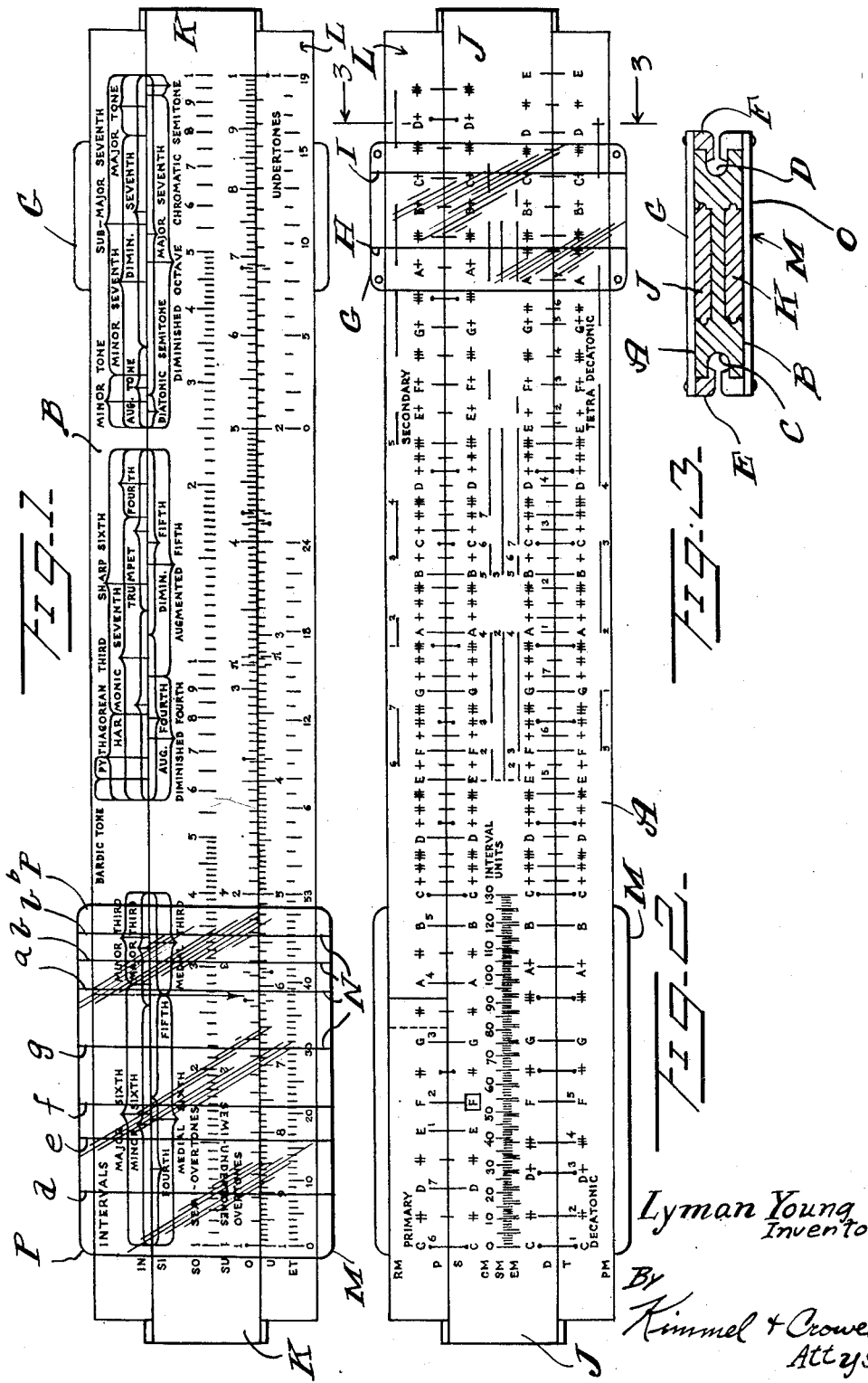
Lyman Young, Inventor
By Kimmel & Crowell, Attys.

Patented Mar. 28, 1950

2,502,300

UNITED STATES PATENT OFFICE 2,502,300

QUARTERTONE SLIDE RULE FOR MUSICIANS

Lyman Young, Laguna Beach, Calif.

Application September 5, 1945, Serial No. 614,543

2 Claims. (Cl. 84—473)

This invention relates to quartertone slide rules and has for its primary object the provision of such a rule which may be very easily operated by one versed in the art of music.

Another object is the provision of such a rule that will render easy the computation of musical intervals, both abstractly and as they occur upon a quartertone keyboard.

Another object is to make easily obtainable the computation of the intervals now used as well as those falling under the heading of some new terms that I have described and illustrated in the drawing.

Another object is to provide a novel slide indicator differing from the usual indicator in that it has two hairlines instead of the usual single hairline, thus dividing the indicator into three separate sections.

A further object is the provision of such a slide rule, which, in construction, other than the characters on its faces, may be made in the same manner as the ordinary engineer's slide rule, thereby simplifying manufacturing procedure.

The accomplishment of the above and many other objects, which will hereinafter appear, will be made clear by a reading of the specification taken in connection with the accompanying drawings, in which Figure 1 is a top plan view of the slide rule, Figure 2 is a plan view of the reverse side of the rule and Figure 3 is an end section taken on the line 3—3 of Figure 1.

Referring now to the drawings, the letter A indicates the upper face of the rule while the letter B indicates the lower face thereof, and extending the length of the rule are the grooves C and D on either side thereof arranged for reception therein of the projections E and F of the indicator G, said indicator having the two hairlines H and I on the face thereof. The indicator may be slid back and forth in the usual manner.

The upper and lower slides J and K have appropriate characters on both sides thereof and the characters of each side may be utilized by merely pulling out the slides and inserting them upside-down.

The frame L is arranged for easy movement of the slidable members. The face, Figure 1, is the natural face upon which appear 7 scales. These are initialed—IN, SI, SO, SU, O, U, and ET. On the reverse side (Figure 2), the keyboard face is initialed with 9 scales—RM, P, S, CM, SM, EM, D, T, and PM.

The O (overtones) scale is a logarithmic scale numbering—1, 2, 3, 4, 5, 6, 7, 8, 9 1—across the length of the rule (similar to the C scale of the ordinary slide rule). This scale is used to define the musical ratios found in a theoretically perfect radiation of overtones, from a fundamental generating tone to mathematical infinity. This fundamental, 1 or unity, is the index of the O scale. The ratios between overtones on this scale are the standard intervals of musical practice. An octave is measured between 1 and 2, a fifth between 2 and 3, a fourth between 3 and 4, a major third between 4 and 5, etc.

Below and opposite to the O scale is the U (undertones) scale. This is similar to the O scale, but reads in the reverse direction, from right to left (as the CI scale of the ordinary slide rule). If the slide is pulled out and inserted upside-down, the measurements of the O and U scales align with each other exactly. (In this position, they may be read against each other like the C and D scales, reversed, on the ordinary slide rule.)

The value for pi, 3.14159, is marked on the O scale with a short repeat accent carried over onto the U scale. Pi is also marked on the U scale with a repeat accent carried over onto the O scale.

Starting from unity, the first five members of the series of summation sixths—1, 1.618, 2.618, 4.236, and 6.854—are indicated by dotted accents over the O scale, with repeat accents carried over onto the U scale.

In the reverse direction on the U scale appear the first three members of the series of double summation tenths—1, 2.4142, 5.8284—indicated by dotted accents over the U scale, with repeat accents carried over onto the O scale.

Above the O scale is the SO (semi-overtones) scale numbering—1, 2, 3, 4, 5, 6, 7, 8, 9, 1, 2, 3, 4, 5, 6, 7, 8, 9, 1—across the length of the rule (similar to the A scale of the ordinary slide rule). The ratios of the SO scale are arbitrarily read as semi-ratios (or square roots of ratios). Thus the ratio 1:2, which is read as the octave on the O scale, is arbitrarily read on the SO scale as the semi-octave, and is actually one half the length of the same numerical ratio on the O scale. This logic is employed to facilitate graphic measurements of intervals and semi-intervals on the quartertone keyboard scales.

The SU (semi-undertones) scale is simply the SO scale inverted, or reversed. It is read by pulling out the slide and inserting it upside-down.

The bracketed intervals of the IN (intervals) and SI (semi-intervals) scales at the top of the natural face are all directly taken from the intervals of the O and SO scales. The use of the initials IN and SI for these scales is not strictly literal, since every interval on both scales is equally divided into semi-intervals by a perpendicular line to the point of each bracket. The bracketed intervals are plainly labeled for the convenience of the musician, who uses them more frequently than the inexhaustible number of other intervals on the O and SO scales which have a lesser value or no value in musical practise. However, many quartertone intervals have not yet been studied, reduced to integer ratios, and named. The only new quartertone terms introduced on the IN and SI scales are "medial sixth" (geometric mean between major and minor sixths), "medial third" (geometric mean between major and minor thirds), and "bardic tone" or semi-Pythagorean-third (a three-quarter tone).

The bracketed intervals are placed in pairs, each pair constituting an octave. Each interval is shown adjacent to its inverted interval—as the fifth is adjacent to the fourth, and the major sixth is adjacent to the minor third.

The vertical line defining the semi-fifth is extended into a long arrow from the top edge of the natural face down to the O scale to demonstrate the slight excess of the medial sixth (point of the arrow) over the summation sixth (dotted accent). The summation sixth (value 1.618034, the so-called "golden-mean") is the theoretical value for which the more practical medial sixth is substituted in quartertone theory. The medial sixth is seen to be constituted of a fourth and a semi-fifth, while the medial third is simply a semi-fifth.

Three different musical scales in equal temperaments are measured on the ET (equal temperaments) scale at the bottom of the natural face. Reading from left to right, the first octave is divided into 53 comma syntonyms, the second into 24 equal quartertones, and the third into 19 consecutive minor thirds reduced in extent to a single octave of 19 equal divisions. The amounts of tempering required for these three systems can be checked on the O scale. One interval of the 53-tone octave will be found to be a practically true comma syntonym—ratio 80:81. Five intervals of the 19-tone scale comprise a practically true minor third—ratio 5:6. Less accuracy is displayed when 14 quartertones are compared to the fifth—ratio 2:3. These three systems of harmony are prominently considered as successors to the well-tempered 12-tone system. Many questions regarding the intervals of these systems can be adequately answered by quick slide rule approximations.

The keyboard face of the musician's quartertone slide rule is a graphic representation of the intervals and musical scales found on a quartertone keyboard instrument tuned in American temperament (as distinguished from equal temperament).

American temperament is an unequal tempering of the octave by the selection of 24 quartertones from among the 130 equal divisions of an octave. This is shown on the slide by the divisions of the octave ratio, 1:2, into units each equal to the 130th root of 2. The selected quartertones are of two different sizes—the semihemitone of 5, and the demisemitone of 6 interval units. Reading from 0, every possible interval on the American quartertone keyboard is indicated by the 44 lines extended below the full scale of 130 lines.

The opposite scales at the top of the keyboard face, P (primary) and S (secondary), instead of indicating that the 12 primary tones are opposite to and above the 12 secondary tones, indicate that the primary scale occupies the left-hand octave shown, and the secondary scale the right-hand octave.

The P scale is constituted of the traditional 12 tones of the present day piano (however, these are indicated in American rather than equal temperament). The diatonic scale—C, D, E, F, G, A, B, C'—is indicated by the seven long lines on the P scale. These correspond to the seven white keys on the piano, while the five short lines correspond to the black keys.

The lines used in defining all the tones on the quartertone keyboard are of three different lengths—long, medium, and short. Long lines define the primary diatonic and the decatonic scales. Medium lines define the secondary diatonic remaining tones on the keyboard.

The S scale is similar to the P scale. The diatonic musical scales of both are in the Ionian mode. The secondary diatonic scale starts a medial third about the primary diatonic, on D sharp plus instead of C. This scale is indicated by seven medium lines, and the other five tones of the S scale by short lines. The S scale only contains those tones, new to musical practise, which the quartertone system introduces. Both the P and S scales are interplaced on the center section of the keyboard scale.

As with P and S scales at the top of the keyboard face, so the D (decatonic) and T (tetra decatonic) scales at the bottom do not lie opposite each other, but the D scale occupies the left-hand octave shown and the T scale the right-hand octave, while the intervening keyboard shows both scales interplaced.

The D scale shows the 10-tone decatonic scale, the new major scale of quartertone practice, indicated with long lines.

The T scale shows the remaining 14 tones of the quartertone keyboard. The 7 medium lines define the upper prismatic scale, and the 7 short lines define the lower prismatic scale.

Nine modally different musical scales are shown in small numbers on the slide rule—the 3-mode skeleton scale, the five-mode pentatonic and decatonic scales, and the seven-mode diatonic, Redfield, chromatic, enharmonic, prismatic, and tetra decatonic scales. Each mode of each scale occupies a range of one octave.

The five initialed modes—RM (Redfield modes), CM (chromatic modes), SM (skeleton modes), EM (enharmonic modes), and PM (pentatonic modes)—are defined on the keyboard face with dash lines.

The diatonic modes are defined by the numbers beside the long lines of the P scale. The decatonic modes by the numbers beside the long lines of the D scale. The prismatic modes by the numbers beside the medium lines of the lower central quartertone keyboard. And the tetra decatonic modes by the numbers beside the medium and short lines of the T scale (these modes, unlike the others described, must be reckoned through the octave below and to the left of each number, rather than through the higher octave to the right of the number).

The three modes of the skeleton scale, as numbered, are—1 central, 2 grave, 3 acute. These names indicate the position of the major tone in each mode.

The five modes of the decatonic scale, as numbered, are—1 Pacific, 2 Atlantic, 3 Taliesin, 4 Lumian, 5 Dresden.

Tradition has not assigned modal names to the pentatonic scale. Because of their similarity (the intervals of the pentatonic scale are double those of the decatonic), it is suggested that the names assigned to the modes of the decatonic scale also be used for the similarly numbered modes of the pentatonic scale.

The seven church modes of the diatonic scale, as numbered on the P scale, are—1 Phrygian, 2 Lydian, 3 Mixolydian, 4 Aeolian, 5 Locrian, 6 Ionian, 7 Dorian.

To avoid confusion among the many 7-tone musical scales found in the quartertone system (especially in American temperament), it is suggested that the names of the church modes be retained for all of them, as numbered. As nearly as possible, the numbering shown conforms to similarity of interval arrangement in the scales themselves. The typical Greek skeleton scale (to which the diatonic, chromatic, and enharmonic modes conformed), read, E—A B—E, and as nearly as plausible the modes on the slide rule begin on E. The scales to which it is intended that the church modes be applied are—diatonic, Redfield, chromatic, enharmonic, prismatic (either upper or lower), and the tetra decatonic.

On the P scale, the tone F is boxed in a square to signify that it is the fundamental of the 12-tone system (or primary Pythagorean cycle of fifths). In the same way, the tone G sharp plus, which is a medial third more acute in pitch, is the fundamental of the secondary 12-tone cycle. If the boxed F is aligned with the solid vertical line at the top of the rule, which marks G sharp plus, the corresponding members of the primary and secondary scales are brought into alignment.

The dotted vertical line for G plus at the top of the rule indicates an absolute pitch value—100 vibrations per second. This is the fundamental F for fundamental pitch, but fundamental pitch is too sharp for musical practice—505.77 V. P. S. for A. If the boxed F (international pitch) is aligned with the dotted line for G plus, the corresponding vibration rates for fundamental pitch and international pitch appear opposite each other. For instance, F sharp plus (fundamental pitch) and A (international pitch) have the same vibration rate—435.64 V. P. S.—and appear opposite each other. F (fundamental pitch) and G plus (international pitch) appear opposite each other, and both vibrate 400 times per second.

Contraction points are indicated by dots placed at the ends of certain lines of the American quartertone keyboard. These "dotted digitals" are— C, D plus, F♯ and G♯ plus. Of the 24 quartertones in American temperament, 10 are demisemitones (6 interval units) and 14 are semihemitones (5 interval units). In distributing these alternately through the octave, the more numerous semihemitones necessarily "double up" at four points—the four points indicated above. The two diatonic intervals which are shortened by these contraction points tend to function in a manner similar to the minor tones of the just diatonic scale.

The transparent indicator G shown differs from the usual indicator in having two hairlines instead of one. The width of the indicator itself measures a "tetrachord," or fourth. The interval between the left edge of the indicator and the left hairline is a bardic tone. The interval between the two hairlines is a semi-fourth. The interval between the right hairline and the right edge of the indicator is a major semitone.

A second transparent indicator M with seven hairlines N (interchangeable with the one already described) has for its main purpose the instant finding of certain chords on the keyboard face of the slide rule.

Following is a description of this second indicator—

The transparent surface O of the indicator M is one octave (ratio 1:2) in width. Running in a perpendicular direction across this face are seven lines N. As illustrated, these lines define the diatonic scale from c to c', plus the introduction of one chromatic tone, b flat, —c, d, e, f, g, a, b, b flat, c'. Also c and c' are defined, not by lines, but by the edges P of the transparent surface O.

Counting from the left, the fourth or dominant line is black, the fifth line is white, and the remaining five lines are both white and colored. Those sections of the five lines which are not specified as colored are understood to remain white.

These lines fall into four divisions from top to bottom of the indicator—top, second, third, and bottom quarters.

Four chords for any tone are indicated by the coloring of these lines. In every case the dominant black line is read into the chord. The major chord is defined by the black line and three red quarter line sections in horizontal alignment. The minor chord is defined by the black line and three green quarter line sections, the major seventh chord by the black line and three orange quarter line sections; the minor seventh by the black line and three violet quarter line sections.

If the dominant black line is placed over the digital g on the keyboard face, then the digitals comprising the g major chord—d, e, g, b—are found by reading across the top quarter of the indicator the red and black lines which fall on these digitals.

The digitals comprising the g minor chord— d, e, g, b flat—are found by reading across the second quarter of the indicator the green and black lines which fall on these digitals.

The digitals comprising the g major seventh chord—d, f, g, b—are found by reading across the third quarter of the indicator the orange and black lines which fall on these digitals.

The digitals comprising the g minor seventh chord—d, f, g, b flat—are found by reading across the bottom quarter of the indicator the violet and black lines which fall on these digitals.

To facilitate reading, a colored dot is placed at the center of each colored quarter line section, matching it in color. Thus, the major chord is defined by the four red dots horizontally aligned across the top quarter of the indicator; the minor chord by the four green dots across the second quarter; the major seventh chord by the four orange dots across the third quarter; the minor seventh by four violet dots across the bottom quarter.

The dominant black line may be placed over any one of the 24 tones of the quartertone octave, and the same four chords may be read off for the selected tone with a single setting of the indicator.

The above is the preferred embodiment of my invention but it is to be understood that modifications may be resorted to that fall within the scope of the claimed invention.

What I claim is:

1. A slide rule for measuring the music intervals and mathematic ratios between tones of a quartertone key board and their relation to the tone of a conventional diatonic keyboard comprising a stationary member, a slidable member, a scale on said slidable member calibrated to linearly represent the twenty-four primary and secondary tones in an octave of the decatonic keyboard in American temperament, groups of linear calibrations on said stationary member based on the same octave length as said scale indicating the primary and secondary tones of the diatonic keyboard in American temperament, and decatonic and tetradecatonic tones of a decatonic keyboard in American temperament, and a transparent cursor adapted to slide over said stationary member and said slidable member and being formed the length of an octave in scale and having transverse hair lines calibrated to indicate the linear relationship of the primary tones of a conventional diatonic keyboard, whereby said decatonic tones and said diatonic tones in American temperament can be related to said conventional diatonic tones.

2. The slide rule of claim 1 provided with a second slidable member interchangeable with said first slidable member and having a logarithmic scale thereon calibrated to indicate the frequency ratios of various tones and related to octave length of said scale on said first slidable member whereby the mathematical ratios of the frequencies of said decatonic and diatonic tones in American temperament and said conventional diatonic tones can be determined.

LYMAN YOUNG.

REFERENCES CITED

The following references are of record in the file of this patent:

UNITED STATES PATENTS

| Number | Name | Date |
|---|---|---|
| 677,817 | Thacher | July 2, 1901 |
| 920,497 | Smith | May 4, 1909 |
| 1,364,154 | Stellman et al. | Jan. 4, 1921 |
| 1,978,038 | Boll | Oct. 23, 1934 |
| 2,326,413 | Thompson | Aug. 10, 1943 |

FOREIGN PATENTS

| Number | Country | Date |
|---|---|---|
| 152,123 | Austria | Dec. 27, 1937 |
| 533,945 | France | Dec. 23, 1921 |